Oct. 17, 1933.  O. E. FISHBURN  1,931,317
ROLLER CLUTCH
Filed March 14, 1931   2 Sheets-Sheet 1
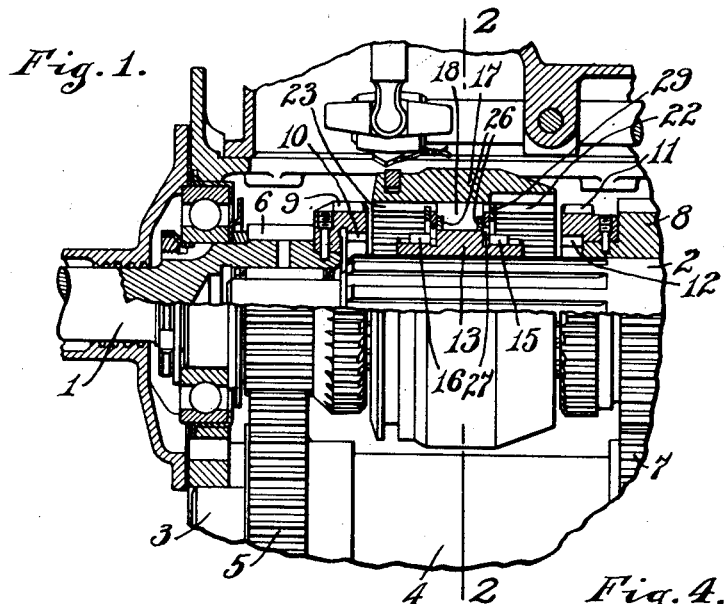
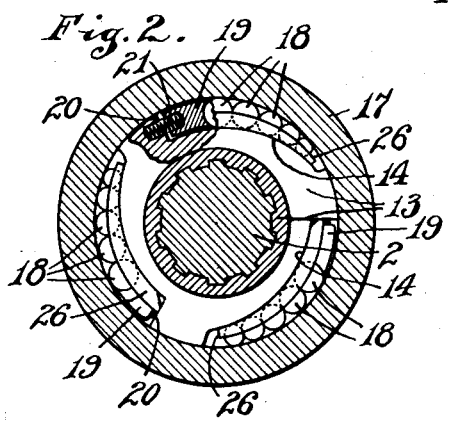
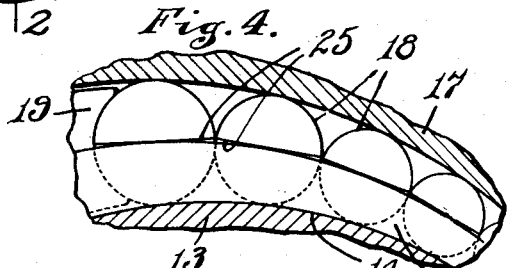
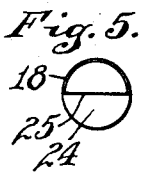
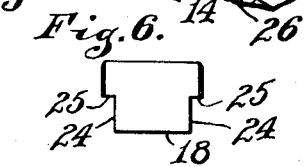
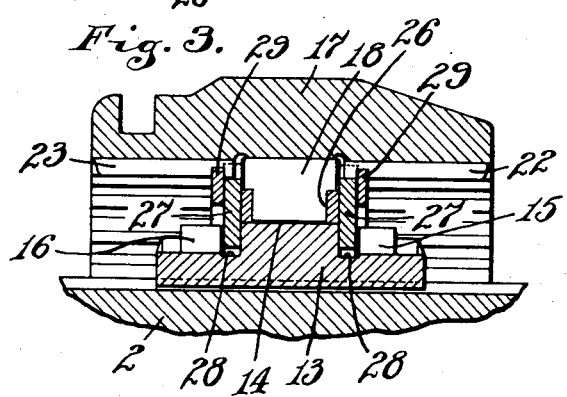
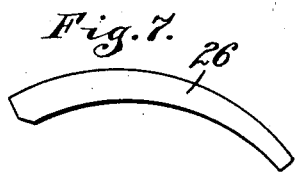
Inventor
Otto E. Fishburn,
By Hood & Hahn
Attorneys Oct. 17, 1933.  O. E. FISHBURN  1,931,317
ROLLER CLUTCH
Filed March 14, 1931   2 Sheets-Sheet 2
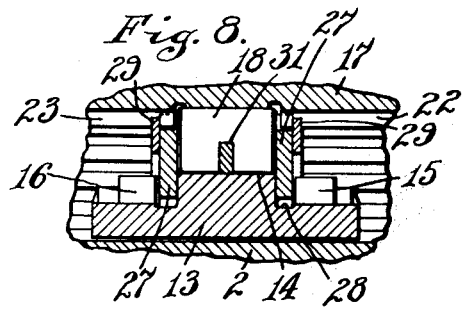
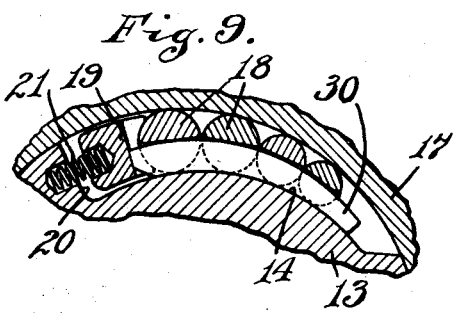
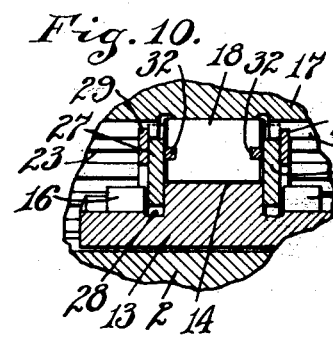
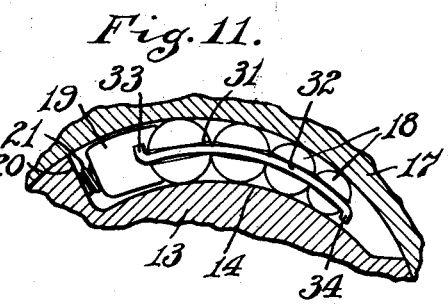
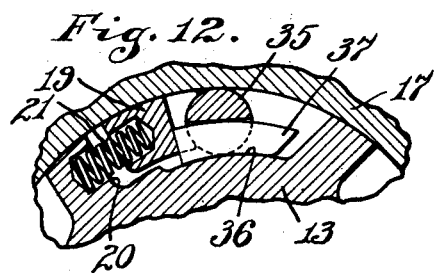
Inventor
Otto E. Fishburn,
By Hood + Hahn.
Attorneys Patented Oct. 17, 1933

1,931,317

UNITED STATES PATENT OFFICE 1,931,317

ROLLER CLUTCH

Otto E. Fishburn, Muncie, Ind.

Application March 14, 1931. Serial No. 522,711

8 Claims. (Cl. 192—45)

My invention relates to improvements in clutches and particularly to the roller type of clutch, wherein rollers are interposed between two members, the surface of one of which is eccentric to the axis of the members whereby upon a tendency of the members to rotate relatively the rollers will ride the eccentric surface and thereby wedge between the members locking the same together. This type of clutch is particularly applicable to a one-way clutch or what has commonly become known as an overrunning clutch.

In this type of clutch, especially where the parts thereof are rotated at a relatively high speed, I have found that in certain instances there is a tendency for the rollers to wear recesses in the eccentric portion of one of the members.

One of the objects of my present invention is to provide a clutch of the above character in which this wearing of the parts is eliminated.

In certain structures the slight wearing of the rollers becomes objectionable in that, when the clutch takes hold there is a certain amount of shock or jarring. Furthermore, there is also a tendency for the clutch to remain engaged upon a reversal of the parts and not release as promptly as it should.

By the provision of my invention whereby the wearing of the parts is prevented the clutch will take hold promptly without perceptible shock, even after a long period of use and will release just as promptly.

My invention is particularly applicable in connection with automobile transmissions wherein an overrunning clutch is interposed between the engine and driven shaft so that, when the momentum of the vehicle operates the driven shaft at a greater speed than that of the engine shaft, the engine and driven shafts will be disconnected.

For disclosing my invention I have illustrated certain embodiments thereof in the accompanying drawings, in which:

Fig. 1 is a partial sectional view of an automobile transmission embodying the clutch of my invention;

Fig. 2 is a transverse sectional view of my improved clutch on the line 2—2 of Fig. 1;

Fig. 3 is a detailed longitudinal sectional view;

Fig. 4 is an enlarged view showing the roller construction more fully in detail;

Figs. 5 and 6 are end and side elevations of one of the rollers;

Fig. 7 is a side elevation of one of the roller locking members;

Figs. 8 and 9 are longitudinal and transverse views respectively of a modification of my invention;

Figs. 10 and 11 are longitudinal and transverse details respectively, of a further modification of my invention, and Fig. 12 is a transverse sectional view of a further modification.

In the transmission structure embodying an application of my invention I have shown an engine or driving shaft 1 adapted to operate the driven shaft 2 of an automobile transmission. This transmission is provided with a jack shaft 3 having a spindle 4 thereon provided with the usual gears for operating the second and low speed, the low speed gear, however, not being shown. For this purpose a gear 5 on the spindle meshes with a gear 6 on the driving shaft 1, a gear 7 meshes with a gear 8 on the driven shaft 2 which gear 8 is normally rotatably mounted on the shaft. The driving shaft is provided with a series of outer peripheral teeth 9 and a series of inner peripheral teeth 10. The gear 8 is provided with a series of outer peripheral teeth 11 and a series of inner peripheral teeth 12.

An overrunning clutch through which the shaft 2 is adapted to be driven either directly from the shaft 1 or by the gear 8, is mounted on the shaft 2. This clutch comprises the inner member 13, splined on the shaft 2 and having a series of cam surfaces 14 which are eccentric to the axis of the member and shaft 2. This member 13 is also provided on its opposite sides with a series of teeth 15 and a series of teeth 16 adapted to mesh respectively under certain conditions with the teeth 12 and 10.

Surrounding the inner member of the overrunning clutch is an outer member 17 and interposed between each of the cam surfaces 14 and the inner surface of the member 17 is a series of rollers 18 gradually diminishing in diameter. These rollers are biased toward the "high" side of the cam 14 by a block 19 between which and a shoulder 20 is arranged a coiled spring 21. The outer member 17 is provided with inner peripheral teeth 22 and 23 adapted to respectively engage the teeth 11 and 9 depending upon the axially shifting of the clutch.

When the member 17 is shifted to the right (Fig. 1) engaging teeth 22 with teeth 11 the shaft 2 is driven from the shaft 1 through the gears 6, 5, 7 and 8 and through the overrunning clutch. If the member 17 is shifted further to the right until teeth 15 mesh with teeth 12 the shaft 2 is driven through the same set of gears with the overrunning clutch "locked out". If the member 17 is shifted to the left engaging teeth 23 and 9 the shaft 2 is driven directly from the shaft 1 through the overrunning clutch. If, however, the overrunning clutch mechanism is shifted further to the left until teeth 16 mesh with teeth 10 the shaft 2 will be driven directly from shaft 1 "locking out" the overrunning clutch.

I have found, in actual practice, that where the rollers 18 are rotatably free, there is a tendency for the rollers, in continued use, to wear the surfaces 14, causing recesses in these surfaces. I have also found that if the rolling movement of the rollers 18 is prevented or limited, the clutch will operate just as effectively and at the same time this wearing of the cam surfaces is prevented. Therefore, in order to prevent the rolling movement of the rollers in operation, the ends of the rollers are cut off as at 24, for half their diameters, leaving shoulders 25 and within this recessed or cut off portion I arrange arcuate wedge shaped members 26 on each side of the rollers. These members are maintained in position by the retaining rings 27 fitting in grooves 28 in the inner member 13 of the clutch and retained in position by split rings 29 fitting in grooves in the outer member of the clutch. These retaining rings not only maintain the locking members 26 in position, but also retain all of the parts of the clutch in assembled relation. The locking members 26 are of sufficient length to engage all of the rollers of each set and at their rear ends abut against the shoulders 20, the blocks 19 being made sufficiently narrow to lie between the members 26. It will be noted that the shoulders 25 are straight and therefore contact with the curved surface of the locking members 26, at one point only. This, therefore, provides for a slight rotative movement of the rollers which has a tendency to assist in the engaging and disengaging action thereof.

In Figs. 8 and 9 I have illustrated a modification of my invention wherein, instead of using a pair of locking members I provide a single locking member 30 adapted to be arranged in a slot 31 formed intermediate of the ends of each roller and it will be noted that in this instance the locking member 30 abuts against the block 19 at its rear end.

In the structure illustrated in Figs. 10 and 11 the ends of the rollers have grooves 31 formed therein to receive a locking member 32, the ends of which are turned up and down as at 33 and 34 to prevent longitudinal displacement thereof.

In Fig. 12 I have illustrated a structure wherein my invention may be applied to that type of clutch in which a series of single rollers cooperates each with a cam surface. In this structure a roller 35 is adapted to cooperate with a cam surface 36 and this roller is slotted intermediate of its ends, to receive the arcuate locking member 37.

In each instance, however, it will be noted that I have provided a locking member for preventing, or substantially preventing a rotative movement on the part of the rollers and thereby causing more of a sliding action in the locking movement of the rollers than a rotating action, although in each instance there is also provided a slight rotative movement.

I claim as my invention:
1. In a clutch, the combination with an inner rotary member and an outer rotary member, one of which is provided with a cammed surface, of a wedging member interposed between said members and having a plurality of axially rotatably locked, oppositely curved rounded surfaces on its opposite sides for engagement with the surfaces of the two members.

2. In a clutch, the combination with an inner rotary member and an outer rotary member, one of which is provided with a cammed surface, of a wedging member interposed between the surfaces of said members, gradually diminishing in thickness and having a plurality of axially rotatably locked, oppositely curved rounded surfaces on its opposite sides for engagement with the surfaces of the two members.

3. In a clutch, the combination with an inner rotary member and an outer rotary member, one of which is provided with a cammed surface, of a roller interposed between said surface and the other member and having a recess extending therethrough transversely of its axis and a locking member engaging in said recess for preventing the rotation of the roller.

4. In a clutch, the combination with an inner rotary member and an outer rotary member, one of which is provided with a cammed surface, of a roller interposed between said surface and the other member having a slot formed therein extending through said roller transversely of its axis and a locking member engaged in said slot for preventing the rotation of said roller.

5. In a clutch, the combination with an outer rotary member and an inner rotary member, one of which is provided with a cammed surface, of a wedging member interposed between said surface and the other member comprising a plurality of normally rotatable members gradually diminishing in size and means for preventing the rotation of said members.

6. In a clutch, the combination with an outer rotary member and an inner rotary member, one of which is provided with a cammed surface, of a plurality of rollers gradually diminishing in diameter interposed between said surface and the other member and means for preventing the rotation of said rollers.

7. In a clutch, the combination with an outer rotary member and an inner rotary member, one of which is provided with a cammed surface of a plurality of rollers gradually diminishing in diameter interposed between said surface and the other member and each having a transverse slot therein, and a locking member engaging in the slots of the rollers for preventing the rotation thereof.

8. In a clutch, the combination with an outer rotary member and an inner rotary member, one of which is provided with a cammed surface, of a roller interposed between said surface and the other member and provided with a straight transversely extending shoulder and a locking member having a curved portion in engagement with said shoulder for preventing rotation of the roller.

OTTO E. FISHBURN.